US009773042B1

(12) United States Patent
Li (10) Patent No.: US 9,773,042 B1
(45) Date of Patent: *Sep. 26, 2017

(54) METHOD AND SYSTEM FOR ACCELERATING DATA MOVEMENT USING CHANGE INFORMATION CONCERNING DIFFERENCE BETWEEN CURRENT AND PREVIOUS DATA MOVEMENTS

(71) Applicant: EMC Corporation, Hopkinton, MA (US)

(72) Inventor: Junxu Li, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/533,053

(22) Filed: Nov. 4, 2014

Related U.S. Application Data (63) Continuation of application No. 13/781,329, filed on Feb. 28, 2013, now Pat. No. 8,909,605.

(51) Int. Cl.
*G06F 17/30* (2006.01)
*G06F 11/14* (2006.01)
*G06F 11/20* (2006.01)
*G06F 11/16* (2006.01)
*H04L 29/08* (2006.01)

(52) U.S. Cl.
CPC .. *G06F 17/30516* (2013.01); *G06F 17/30289* (2013.01); *G06F 11/1451* (2013.01); *G06F 11/1453* (2013.01); *G06F 11/1469* (2013.01); *G06F 11/1471* (2013.01);
(Continued)

(58) Field of Classification Search
CPC .. G06F 8/71; G06F 17/30289; G06F 11/2066; G06F 11/2043; G06F 11/1451; G06F 11/1469; G06F 11/1662; G06F 11/1471; G06F 11/1453; H04L 67/1097
USPC ............... 707/681, 674–678, 652, 686, 695; 709/201, 203, 213, 217; 717/122; 711/162
See application file for complete search history.

(56) References Cited

U.S. PATENT DOCUMENTS

| 5,909,569 | A | 6/1999 | Housel, III et al. |
| 6,023,295 | A | 2/2000 | Pau |

(Continued)

FOREIGN PATENT DOCUMENTS

WO     WO 03055169 A1     7/2003

*Primary Examiner* — Frantz Coby
(74) *Attorney, Agent, or Firm* — Blakely, Sokoloff, Taylor & Zafman LLP (57) ABSTRACT

According to one embodiment, a first storage system receives a first data stream from a second storage system over a network. The first data stream includes data objects and differential object information identifying at least one data object missing from the first data stream. A difference between the first data stream and a second data stream that has been previously received is determined based on the differential object information, including identifying a data object that has been added, deleted, or modified in view of the second data stream. The first data stream is reconstructed based on the second data stream and the difference between the first data stream and the second data stream, generating a third data stream. The third data stream is stored in a persistent storage device of the first storage system, the third data stream representing a complete first data stream without a missing data object.

26 Claims, 5 Drawing Sheets

(52) U.S. Cl.
CPC ...... *G06F 11/1662* (2013.01); *G06F 11/2066* (2013.01); *H04L 67/1097* (2013.01)

(56) References Cited

U.S. PATENT DOCUMENTS

| | | | |
|---|---|---|---|
| 6,188,804 B1* | 2/2001 | Weldy | G06T 5/20 |
| | | | 382/254 |
| 6,237,052 B1* | 5/2001 | Stolowitz | G06F 3/061 |
| | | | 710/61 |
| 6,950,966 B2 | 9/2005 | Chiquoine | G06F 11/1076 |
| | | | 714/42 |
| 7,386,621 B1* | 6/2008 | Hlasny | H04L 12/1868 |
| | | | 370/471 |
| 7,475,277 B1* | 1/2009 | Holdman | G06F 11/1435 |
| | | | 714/5.11 |
| 7,555,674 B1* | 6/2009 | Wang | G06F 11/1662 |
| | | | 714/12 |
| 7,599,294 B2* | 10/2009 | Walsh | H04L 1/1607 |
| | | | 370/230.1 |
| 7,653,284 B2* | 1/2010 | Adolph | G11B 27/034 |
| | | | 386/248 |
| 7,685,189 B2* | 3/2010 | Mittal | G06F 11/1451 |
| | | | 707/686 |
| 7,788,532 B2* | 8/2010 | Kawamura | G06F 11/1471 |
| | | | 707/652 |
| 7,970,772 B2* | 6/2011 | Aggarwal | G06K 9/6284 |
| | | | 707/737 |
| 8,185,885 B2* | 5/2012 | Clement | G06F 8/71 |
| | | | 717/122 |
| 8,320,770 B2 | 11/2012 | Nedovic | |
| 8,380,686 B2* | 2/2013 | Wolfgang | G06F 11/2066 |
| | | | 707/695 |
| 8,453,155 B2* | 5/2013 | Golab | G06F 9/5027 |
| | | | 718/102 |
| 8,503,568 B1 | 8/2013 | Pheiffer et al. | |
| 8,681,917 B2 | 3/2014 | McAllister et al. | |
| 8,688,645 B2* | 4/2014 | Sadhwani | G06F 11/1469 |
| | | | 707/681 |
| 8,706,710 B2* | 4/2014 | Bird | G06F 17/30094 |
| | | | 707/705 |
| 8,856,217 B2* | 10/2014 | Okada | H04N 7/173 |
| | | | 709/201 |
| 8,909,605 B1* | 12/2014 | Li | G06F 11/1453 |
| | | | 707/674 |
| 2003/0004990 A1* | 1/2003 | Draper | H04L 29/06027 |
| | | | 715/234 |
| 2006/0227911 A1 | 10/2006 | Millman et al. | |
| 2009/0125692 A1* | 5/2009 | Yamamoto | G06F 11/1451 |
| | | | 711/162 |
| 2011/0161457 A1* | 6/2011 | Sentinelli | H04L 1/0045 |
| | | | 709/217 |
| 2011/0243991 A1 | 10/2011 | Reineke | |
| 2011/0317833 A1* | 12/2011 | Westerveld | H04N 21/2347 |
| | | | 380/210 |
| 2012/0047341 A1* | 2/2012 | Ishinabe | G06F 11/1451 |
| | | | 711/162 |
| 2012/0213238 A1* | 8/2012 | Hayano | H01S 3/131 |
| | | | 372/38.04 |
| 2014/0089471 A1 | 3/2014 | Pianese et al. | |

\* cited by examiner

METHOD AND SYSTEM FOR ACCELERATING DATA MOVEMENT USING CHANGE INFORMATION CONCERNING DIFFERENCE BETWEEN CURRENT AND PREVIOUS DATA MOVEMENTS

RELATED APPLICATION

This is a continuation application of U.S. patent application Ser. No. 13/781,329, filed Feb. 28, 2013, which is incorporated by reference herein in its entirety.

FIELD OF THE INVENTION

Embodiments of the present invention relate generally to data storage systems. More particularly, embodiments of the invention relate to accelerating data movement using change information concerning difference between current and previous data movements.

BACKGROUND

Data movement is a critical feature for disaster recovery appliances. There are numerous configurations where data are transmitted across the network for disaster recovery purposes: pairs of office protecting each other, satellite offices transmitting to headquarters, and satellite offices transmitting to relay stations that consolidate and then transmit to one or more national data centers. Communication may occur over low bandwidth links because customers are located in inhospitable locations such as offshore or in forests. The goal for disaster recovery purposes is to improve data compression during replication so more data can be protected within a data movement window.

The challenge is to transfer all of the logical data (e.g., all files within the retention period) while reducing the transmission as much as possible. Storage appliances achieve high compression by transferring metadata that can reconstruct all of the files based on strong fingerprints of segments followed by the unique data segments. One way to reduce network traffic is to identify delta changes between a previous backup and a new backup at the time of the backup, and only transmit the difference between the previous backup and the new backup to a target storage system. However, the delta changes are typically not maintained for subsequent backups. Thus, when a new backup is to be transferred, the backup logic has to perform additional scanning to determine what needs to be moved, which will unnecessarily impact the performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for accelerating data movement using delta change information between a previous data stream and a new data stream are described herein. According to some embodiments, delta change information is maintained by a source storage system for subsequent data movement transactions (e.g., subsequent data migration and/or backup/replication). As data movement software (e.g., backup or migration software) performs a new data movement transaction, it can detect what data have changed since last data movement transaction, and such delta change information between the transactions is organized in an efficient index table for fast identification of changes. Thus, when data replication and migration is performed, only the changed data are needed to transfer to the new destination to build identical copy of a new data stream. There is no need to scan the full data stream in order to calculate the difference between two full data streams, thus it can reduce I/O load on disk and improve overall data replication and migration efficiency. For the purpose of illustration only, backup or migration is utilized as an example of data movement; however, other types of data movements can also be applied.

According to one embodiment, one or more changed object data structures or tables are maintained to store information identifying a data object that has been added, deleted, or modified since the last backup. For each modified data object, a changed block data structure or table is maintained that identifies one or more data blocks within the corresponding modified data object that have been added, deleted, or modified since the last backup. Only the new data objects and new or modified blocks of a modified data object, collectively referred to delta changed data, are transmitted to a target storage system. According to one embodiment, differential encoding information (e.g., metadata or fingerprints) encoding the delta changed data is then transmitted to the target storage to confirm whether the target storage system indeed has what the source storage system thinks it has. After the confirmation, the actual missing data objects or data blocks are then transmitted to the target storage, without having to transmit the entire backup stream.

Figure 1:
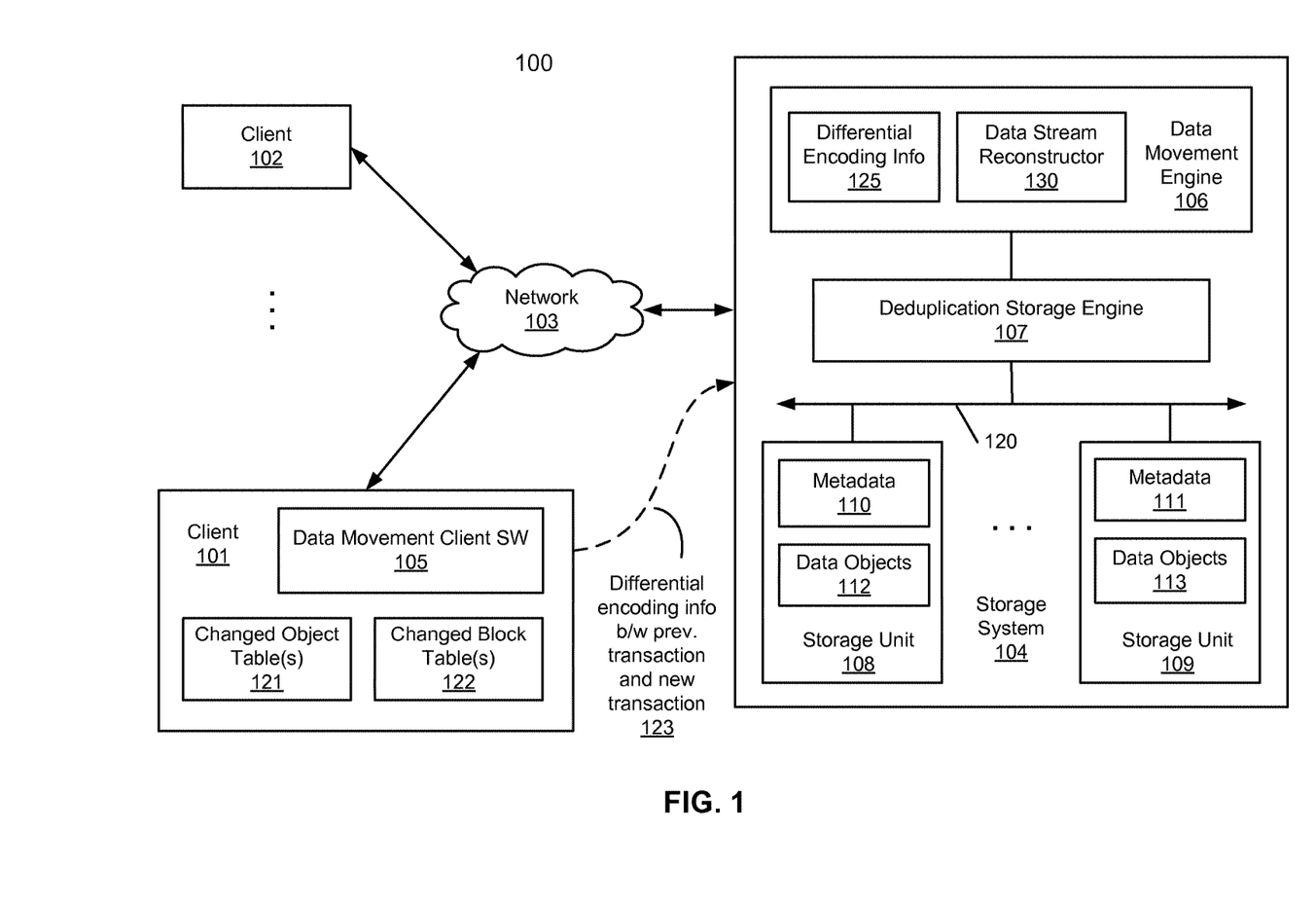
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof. Clients 101-102 may represent a source storage system having a replication or backup client software such as replication client 105 to replicate data from the source storage system to a target storage system such as storage system 104.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, replication or data movement engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Storage system 104 may be target storage system to received data replicated or backed up from a client storage system such as storage systems 101-102.

In response to a data file to be stored (e.g., backed up or replicated) in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. Data movement engine 106 and deduplication storage engine 107 may be implemented as an integrated unit or component. Note that the system architecture of clients 101-102 may be the same or similar to storage system 104. Any of storage systems 101-102 and 104 may be a source storage system, a target storage system, or both for the purpose of data movement, dependent upon the circumstances such as data movement directions.

In one embodiment, source storage system 101 includes data movement client software 105 responsible at the source side for perform data movement (e.g., data replication and/or migration) from source storage system 101 to storage system 104 as a target storage system. Data movement client software 105 tracks the changes between two data movement transactions. For example, for the purpose of illustration herein, data movement client software 105 is backup client software that keeps track the difference between a previous backup and a current backup (e.g., difference between two snapshots or consistency points) of storage system 101. In one embodiment, the difference between two backups may be maintained as part of one or more changed object data structures or tables 121 and one or more changed block data structures or tables 122, which may be stored in a persistent storage device and maintained by backup client software 105 during the course of operations of storage system 101.

In one embodiment, changed object table 121 is to store information identifying a data object that has been added, deleted, or modified since the last backup. A data object may represent a common data unit in file systems and/or a wide variety of applications. A data object may include data and metadata that describes the data. A data object can represent a file, a directory of one or more files, a virtual machine (VM) disk image, a physical LUN image, or an application specific data unit. A data object that has been modified refers to a modification on a data object that exists in a previous data stream as well as in a new data stream. A data object that has been inserted refers to an insert of a new data object that does not exist in a previous data stream. A data object that has been deleted refers to a deletion of a data object of the previous data stream that no longer exists in a new data stream.

For each modified data object, changed block data structure or table 122 is maintained that identifies one or more data blocks or chunks within the corresponding modified data object that have been added, deleted, or modified since the last backup. A data block that has been modified refers to a modification on a data block that exists in a corresponding data object in a previous data stream as well as in a new data stream. A data block that has been inserted refers to an insert of a new data block of a corresponding data object that does not exist in a previous data stream. A data block that has been deleted refers to a deletion of a data block of a corresponding data object of the previous data stream that no longer exists in a new data stream.

Only the new data objects and new or modified blocks of a modified data object, collectively referred to delta changed data, are transmitted from source storage system 101 to a target storage system 104. According to one embodiment, differential encoding information 123 (e.g., metadata or fingerprints) encoding the delta changed data is then transmitted to the target storage system 104 to confirm whether the target storage system indeed has what the source storage system 101 thinks the target storage system 104 has. After the confirmation, the actual missing data objects or data blocks are then transmitted from source storage 101 to the target storage 104, without having to transmit the entire backup stream.

Thus, two types of data structures are utilized to describe the changes between backups: 1) a changed object table (COT) that describes changed objects; and 2) a changed block table (CBT) that describes changed blocks within an object. In one embodiment, the data structures may be organized as B+Trees, and are populated with change information with respect to a previous backup (e.g., the last full backup) as the current backup takes place.

A B+ tree is an n-ary tree with a variable but often large number of children per node. A B+ tree of order v consists of a root, internal nodes and leaves. The root may be either leaf or node with two or more children. A B+ tree can be viewed as a B-tree in which each node contains only keys (not pairs), and to which an additional level is added at the bottom with linked leaves. The primary value of a B+ tree is in storing data for efficient retrieval in a block-oriented storage context—in particular, file systems. This is primarily because unlike binary search trees, B+ trees are self-balanced and have very high fanout (typically on the order of 100 or more), which reduces the number of I/O operations required to find an element in the tree.

A previous backup can be a physical full backup as well as a virtual full backup. A changed object table uses object identifier (ID) identifying an object as a key for index, where an object ID is a globally unique ID within a backup stream for a data object, also referred to as a backup object. For each object ID with a change attribute of "modified," there is a corresponding reference to a changed block table for that object, where the reference represents the root of a B+Tree for the changed block table. The changed block table is indexed by a changed block offset, and there is a changed block data size for a block offset. For each object ID with an attribute of "inserted" or "deleted," there is no changed block table associated with it, as there is no need to keep track of that information.

Figure 2:
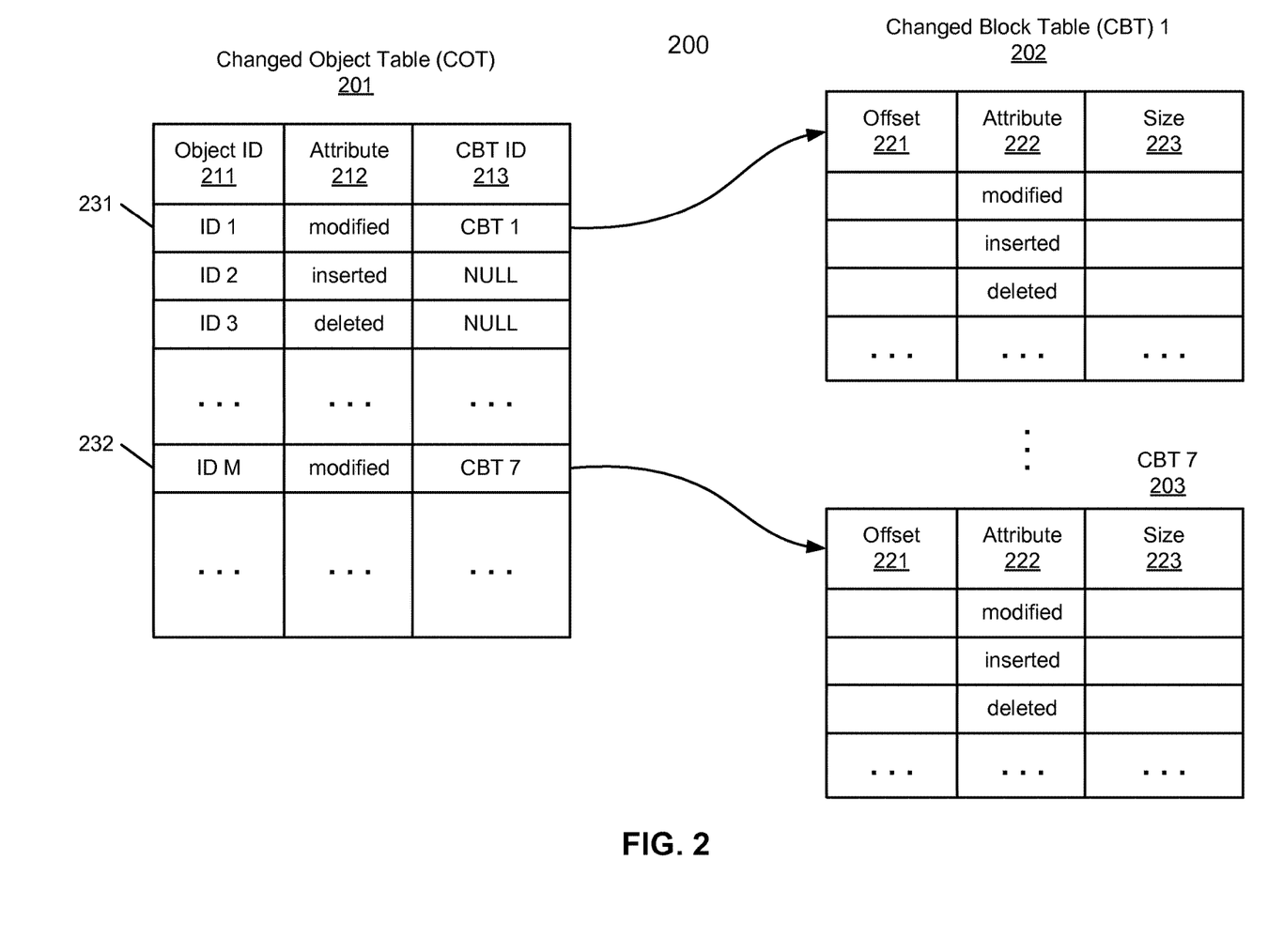
FIG. 2 is a block diagram illustrating an example of a data structure storing delta changes of data streams according to one embodiment of the invention.

FIG. 2 is a block diagram illustrating an example of a data structure storing delta changes of data streams according to one embodiment of the invention. Referring to FIG. 2, changed object table 201 may represent changed object table(s) 121 of FIG. 1, while changed block tables 202-203 may be implemented as part of changed block table(s) 122 of FIG. 1. Tables 201-203 may be maintained by a source storage system such as source storage systems 101-102 of FIG. 1. In one embodiment, changed object table 201 includes multiple entries, each entry corresponds to one of data objects of a data stream that has been previously transmitted to a target storage system such as storage system 104. Changed object table 201 may be indexed based on object IDs. Each entry of changed object table 201 includes object ID field 211 storing an object ID, change attribute field 212 storing a change attribute (e.g., inserted, modified, or deleted), and CBT ID field 213 referencing to a changed block table such as CBT tables 202-203.

As described above, for an object indicated by change attribute 212 as an inserted object or a deleted object from a previous data stream, there is no corresponding CBT and the reference in CBT ID field 213 is NULL or zero. For each of the objects that are indicated as modified objects via change attribute 212, its associated CBT ID field 213 stores a CBT ID identifying one of the CBTs 202-203. In this example, CBT ID fields 213 of entries 231-232 links with CBT 202-203, respectively.

In one embodiment, each of CBTs 202-203 includes multiple entries, each corresponding to one of the data blocks within the associated data object. A data block may represent one or more deduplicated data segments, also referred to as data chunks, which may be in a fixed size or variable size. Each entry includes an offset field 221, a change attribute field 222, and a size field 223. Offset field 221 specifies an offset within a previous data stream at which the corresponding data block is located. Attribute field 222 indicates whether the corresponding data block has been inserted, modified, or deleted with respect to the previous data stream. Size field 223 specifies the size of the corresponding data block. The information collectively represented by tables 201-203 is referred to as change information such as differential encoding information 123 of FIG. 1.

The change information can be utilized to accelerate backup data replication and migration. It is assumed that there is an identical copy of a previous full backup in a remote site (e.g., target 104), and there is a new backup as well as change information from the previous full backup generated in a local site (e.g., source 101). The goal is to efficiently generate another copy of the new full backup in the remote site. In the case of data migration, after the remote copy has been generated, the local copy can be deleted.

For each object that has been deleted from previous full backup, no data from that object are needed for transfer to the remote site. For each object that has been inserted in the new full backup, the entire object will be transferred to the remote site. For each object that has been modified, only the modified blocks described by the associated changed block table are needed for transfer to the remote site. The remaining unchanged data objects or data blocks are to be directly copied from the previous full backup that already exists in the remote site to generate the new full backup.

Figure 3:
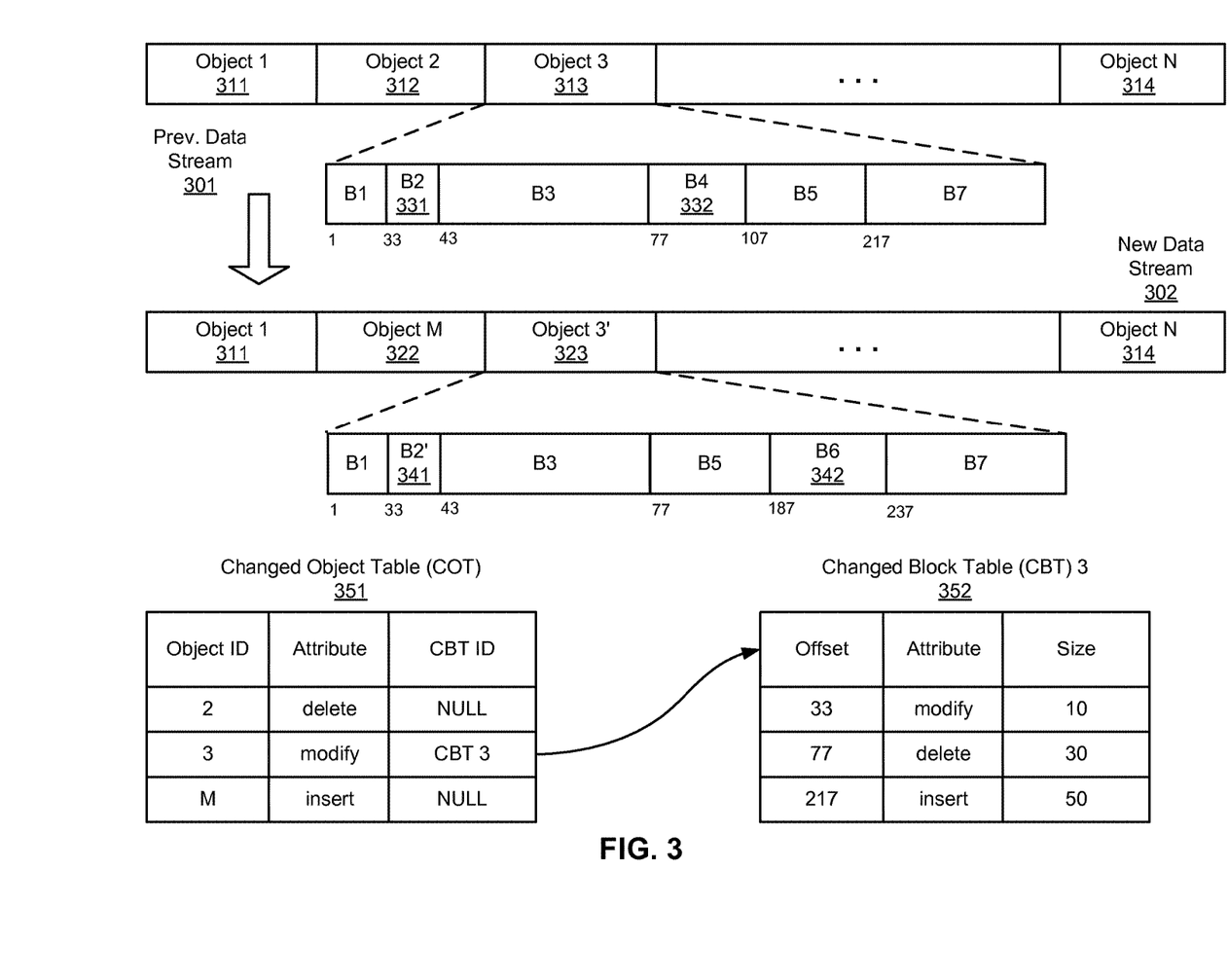
FIG. 3 is a processing diagram illustrating an example of generating differential encoding information according to one embodiment of the invention.

FIG. 3 is a processing diagram illustrating an example of generating differential encoding information according to one embodiment of the invention. Referring to FIG. 3, in this example, it is assumed data stream 301 has been previously transmitted to a remote target storage system during a previous data movement transaction and a new data stream 302 is about to be transmitted to the target storage. Data stream 301 includes data objects 311-314. The difference between data stream 301 and 302 can be summarized in view of data stream 301 as follows: 1) object 312 has been deleted; 2) object 322 has been added; and 3) object 313 has been modified as data object 323. In this example, object 322 is inserted at the same location of object 312. However, object 322 can be inserted in any other location within data stream 301, as long as the information concerning the location of the inserted object is communicated to the target storage system. Within object 323 compared to object 313, block 331 has been modified becoming block 341; block 332 has been deleted; and block 342 has been inserted. Based on the delta information, changed object table 351 and changed block table 352 are maintained. In this example, block B4 has been removed from data stream 301. Thus, block B5 is shifted forward to the original location of block B4 at offset 77 (e.g., the amount equivalent to the size of removed block B4). As a result, block B6 is shifted forward to offset 187, even though changed block table 352 indicates that block B6 should be inserted at the offset 217 of data stream 301. Similarly, block B7 is shifted forward. Based on the information from tables 351-352, only the modified and inserted objects and blocks will be transmitted to the target storage system. The target storage system can obtain the rest of the data stream 302 from the previously transmitted data stream 301 locally. In one embodiment, virtual synthesis can be used to fast copy existing data without actually performing costly I/O operations. Virtual synthesis refers to an internal data organization procedure that can produce a sequential data layout using existing chunks of data and their references without actually copying them.

Figure 4:
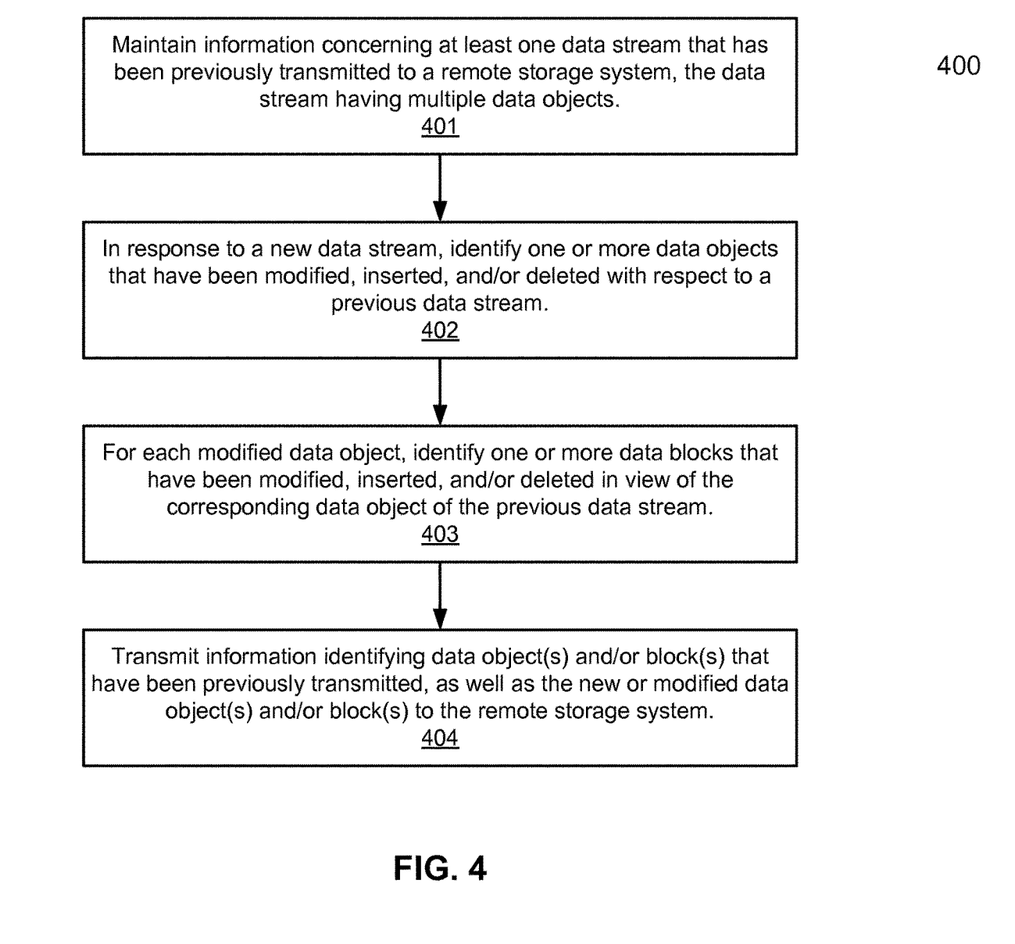
FIG. 4 is a flow diagram illustrating a method for encoding delta change between data streams for accelerating data movements between a source storage system and a target storage system according to one embodiment of the invention.

FIG. 4 is a flow diagram illustrating a method for encoding delta change between data streams for accelerating data movements between a source storage system and a target storage system according to one embodiment of the invention. Method 400 may be performed by data movement logic of a source storage system (e.g., data movement client software 105 of source storage 101 of FIG. 1), which may be implemented in software, hardware, or a combination thereof. Referring to FIG. 4, at block 401, processing logic maintains change information concerning changes of at least one data stream that has been previously transmitted to a target storage system, since the last data movement transaction (e.g., backup, migration). In one embodiment, the change information may be maintained via one or more changed object data structures and one or more changed block data structures as described above. At block 402, in response to a new data stream, processing logic identifies (e.g., using a changed object data structure) one or more data objects that have been modified, inserted, and/or deleted with respect to the previous transmitted data stream. At block 403, for each modified data object, processing logic identifies (e.g., using a changed block data structure) one or more data blocks that has been modified, inserted, and/or deleted in view of the corresponding data object of the previous data stream. At block 404, processing logic transmits information identifying data object(s) and/or block(s) that have been previously transmitted, as well as any new or modified data object(s) and/or block(s) to the target storage system.

Figure 5:
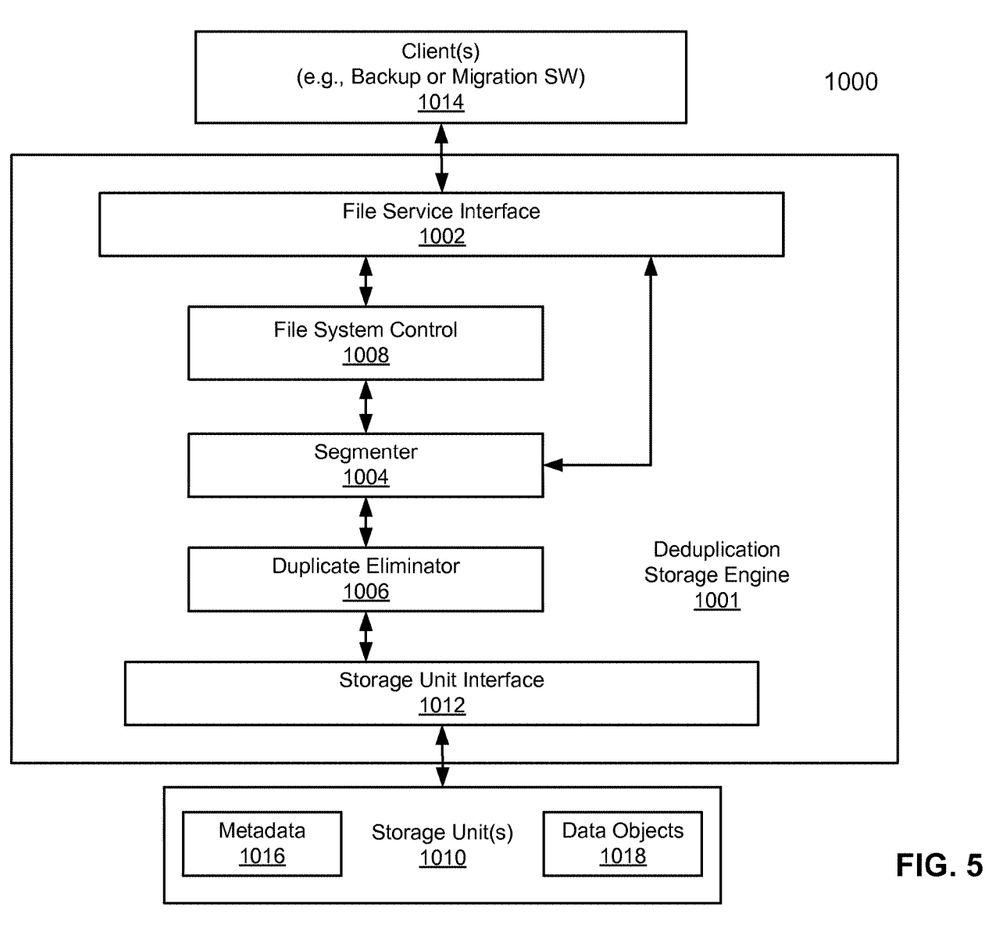
FIG. 5 is a block diagram illustrating a deduplicated storage system according to one embodiment of the invention.

FIG. 5 is a block diagram illustrating a deduplication storage system according to one embodiment of the invention. For example, deduplication storage system 1000 may be implemented as part of a deduplication storage system as described above, such as source or target storage system of FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Massachusetts.

In one embodiment, storage system 1000 includes a deduplication engine 1001 interfacing one or more clients 1014 with one or more storage units 1010 storing metadata 1016 and data objects 1018. Clients 1014 may be any kinds of clients such as a client application or backup software located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 1010 may be organized into one or more volumes of Redundant Array of Inexpensive Disks (RAID). Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a CR of data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace of a file system associated with the deduplication storage engine 1001. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for data movement over a network, the method comprising:

receiving, at a first storage system, a first data stream from a second storage system over a network, the first data stream having a plurality of data objects, each identified by a data object identifier (ID), the first data stream including differential object information identifying at least one data object missing from the first data stream, wherein the differential object information comprises a changed object table having a plurality of entries, each entry corresponding to a data object identified by an object identifier, wherein each entry further includes an attribute indicating whether the corresponding data object has been modified, inserted, or deleted with respect to a second data stream;

determining a difference between the first data stream and the second data stream that has been previously received from the second storage system based on the differential object information, including identifying a data object of the first data stream that has been added from the second data stream, a data object of the second data stream that has been deleted, or a data object of the second data stream that has been modified in the first data stream;

generating a third data stream based on the second data stream and the difference between the first data stream and the second data stream; and storing the third data stream in a persistent storage device of the first storage system, the third data stream representing a complete first data stream without a missing data object.

2. The method of claim 1, further comprising:

obtaining from the differential object information differential block information representing one or more modified data blocks of one or more modified data objects, wherein the differential block information identifies one or more data blocks within a data object that have been modified with respect to a corresponding data object of the second data stream; and adding the one or more data blocks of a modified data object from the first data stream into the third data stream.

3. The method of claim 2, wherein the differential block information further identifies one or more blocks that have been added or deleted with respect to the second data stream.

4. The method of claim 1, wherein the first storage system is a deduplicated storage system.

5. The method of claim 3, wherein each entry of the changed object table associated with a modified data object further includes a reference linking to a changed block table storing one or more data blocks within the data object that have been modified, added, or deleted with respect to a corresponding data object of the second data stream.

6. The method of claim 5, wherein the changed block table comprises a plurality of entries, each entry corresponding to a data block, including an offset of the first data stream at which the corresponding data block has been modified, added, or deleted.

7. The method of claim 6, wherein each entry of the changed block table further includes information specifying a size of the data block, wherein information of the changed block table is utilized to generate differential block information.

8. The method of claim 1, wherein a data object or data block that has been deleted from the second data stream is not included in the first data stream received from the second storage system.

9. The method of claim 1, wherein a data object or data block as a part of the first data stream but also exists in the second data stream is not included in the first data stream.

10. A non-transitory machine-readable medium having instructions stored therein, which when executed by a processor, cause the processor to perform operations of data movement over a network, the operations comprising:

receiving, at a first storage system, a first data stream from a second storage system over a network, the first data stream having a plurality of data objects, each identified by a data object identifier (ID), the first data stream including differential object information identifying at least one data object missing from the first data stream, wherein the differential object information comprises a changed object table having a plurality of entries, each entry corresponding to a data object identified by an object identifier, wherein each entry further includes an attribute indicating whether the corresponding data object has been modified, inserted, or deleted with respect to a second data stream;

determining a difference between the first data stream and the second data stream that has been previously received from the second storage system based on the differential object information, including identifying a data object of the first data stream that has been added from the second data stream, a data object of the second data stream that has been deleted, or a data object of the second data stream that has been modified in the first data stream;

generating a third data stream based on the second data stream and the difference between the first data stream and the second data stream; and storing the third data stream in a persistent storage device of the first storage system, the third data stream representing a complete first data stream without a missing data object.

11. The non-transitory machine-readable medium of claim 10, wherein the operations further comprise:

obtaining from the differential object information differential block information representing one or more modified data blocks of one or more modified data objects, wherein the differential block information identifies one or more data blocks within a data object that have been modified with respect to a corresponding data object of the second data stream; and adding the one or more data blocks of a modified data object from the first data stream into the third data stream.

12. The non-transitory machine-readable medium of claim 11, wherein the differential block information further identifies one or more blocks that have been added or deleted with respect to the second data stream.

13. The non-transitory machine-readable medium of claim 10, wherein the first storage system is a deduplicated storage system.

14. The non-transitory machine-readable medium of claim 12, wherein each entry of the changed object table associated with a modified data object further includes a reference linking to a changed block table storing one or more data blocks within the data object that have been modified, added, or deleted with respect to a corresponding data object of the second data stream.

15. The non-transitory machine-readable medium of claim 14, wherein the changed block table comprises a plurality of entries, each entry corresponding to a data block, including an offset of the first data stream at which the corresponding data block has been modified, added, or deleted.

16. The non-transitory machine-readable medium of claim 15, wherein each entry of the changed block table further includes information specifying a size of the data block, wherein information of the changed block table is utilized to generate differential block information.

17. The non-transitory machine-readable medium of claim 10, wherein a data object or data block that has been deleted from the second data stream is not included in the first data stream received from the second storage system.

18. The non-transitory machine-readable medium of claim 10, wherein a data object or data block as a part of the first data stream but also exists in the second data stream is not included in the first data stream.

19. A storage system, comprising:
a storage device; and
a data stream reconstructor coupled to the storage device to
receive a first data stream from a second storage system over a network, the first data stream having a plurality of data objects, each identified by a data object identifier (ID), the first data stream including differential object information identifying at least one data object missing from the first data stream, wherein the differential object information comprises a changed object table having a plurality of entries, each entry corresponding to a data object identified by an object identifier, wherein each entry further includes an attribute indicating whether the corresponding data object has been modified, inserted, or deleted with respect to a second data stream,
determine a difference between the first data stream and the second data stream that has been previously received from the second storage system based on the differential object information, including identifying a data object of the first data stream that has been added from the second data stream, a data object of the second data stream that has been deleted, or a data object of the second data stream that has been modified in the first data stream,
generate a third data stream based on the second data stream and the difference between the first data stream and the second data stream, and
store the third data stream in the storage device, the third data stream representing a complete first data stream without a missing data object.

20. The system of claim 19, wherein the data stream reconstructor is further to obtain from the differential object information differential block information representing one or more modified data blocks of one or more modified data objects, wherein the differential block information identifies one or more data blocks within a data object that have been modified with respect to a corresponding data object of the second data stream, and
add the one or more data blocks of a modified data object from the first data stream into the third data stream.

21. The system of claim 20, wherein the differential block information further identifies one or more blocks that have been added or deleted with respect to the second data stream.

22. The system of claim 19, wherein the storage system is a deduplicated storage system.

23. The system of claim 21, wherein each entry of the changed object table associated with a modified data object further includes a reference linking to a changed block table storing one or more data blocks within the data object that have been modified, added, or deleted with respect to a corresponding data object of the second data stream.

24. The system of claim 23, wherein the changed block table comprises a plurality of entries, each entry corresponding to a data block, including an offset of the first data stream at which the corresponding data block has been modified, added, or deleted.

25. The system of claim 24, wherein each entry of the changed block table further includes information specifying a size of the data block, wherein information of the changed block table is utilized to generate differential block information.

26. The method of claim 1, wherein generating a third data stream comprises:
generating a third data stream based on the second data stream, the difference between the first data stream and the second data stream, and a fourth data stream received at the first storage system from the second storage system over a network, wherein the fourth data stream contains the at least one missing data object of the first data stream, and the fourth data stream is received separately from the first data stream after confirming the first storage system has the second data stream.

* * * * *